(12) United States Patent
Lafay

(10) Patent No.: US 12,138,680 B2
(45) Date of Patent: Nov. 12, 2024

(54) COMPOSITIONS COMPRISING SILICATES AND METHODS OF USE THEREOF IN SAND CASTING

(71) Applicant: Imerys USA, Inc., Roswell, GA (US)

(72) Inventor: Victor S. Lafay, Cincinnati, OH (US)

(73) Assignee: IMERYS USA, INC., Roswell, GA (US)

( * ) Notice: Subject to any disclaimer, the term of this patent is extended or adjusted under 35 U.S.C. 154(b) by 762 days.

(21) Appl. No.: 16/327,943

(22) PCT Filed: Aug. 24, 2017

(86) PCT No.: PCT/US2017/048316
§ 371 (c)(1),
(2) Date: Feb. 25, 2019

(87) PCT Pub. No.: WO2018/039404
PCT Pub. Date: Mar. 1, 2018

(65) Prior Publication Data
US 2019/0184449 A1 Jun. 20, 2019

Related U.S. Application Data

(60) Provisional application No. 62/379,461, filed on Aug. 25, 2016.

(51) Int. Cl.
*B22C 1/02* (2006.01)
*B22C 1/10* (2006.01)
(Continued)

(52) U.S. Cl.
CPC ............... *B22C 1/02* (2013.01); *B22C 1/10* (2013.01); *B22C 1/18* (2013.01); *B22C 9/02* (2013.01);
(Continued)

(58) Field of Classification Search
CPC ... C04B 28/001; C04B 14/024; C04B 14/041; C04B 14/046; C04B 14/06;
(Continued)

(56) References Cited

U.S. PATENT DOCUMENTS 4,059,453 A * 11/1977 Dittrich .................. B22C 1/165
106/38.3
5,911,269 A * 6/1999 Brander .................. B22C 1/02
164/523
(Continued)

FOREIGN PATENT DOCUMENTS

EP 0279031 A1 * 8/1988 ......... C04B 40/0039
WO WO 2015/100050 A1 7/2015

OTHER PUBLICATIONS

General Properties of Muscovite Ground Mica to Tracons 2009.*
(Continued)

*Primary Examiner* — Shuangyi Abu Ali
(74) *Attorney, Agent, or Firm* — KUSNER & JAFFE

(57) ABSTRACT

Compositions useful for foundry processes such as green sand casting are discussed. The compositions may comprise an aggregate, at least one inorganic binding agent, and at least one high aspect ratio silicate. For example, the composition may comprise sand, one or more clay materials serving as a binding agent, and a high aspect ratio silicate chosen from mica, talc, or a combination thereof. The composition may be formed into a green sand mold for use in casting molded articles. Incorporation of the high aspect ratio silicate may help to improve the quality of the casted article.

20 Claims, 5 Drawing Sheets

(51) Int. Cl.
  *B22C 1/18* (2006.01)
  *B22C 9/02* (2006.01)
  *C04B 28/00* (2006.01)
  *C04B 111/00* (2006.01)

(52) U.S. Cl.
  CPC ..... *C04B 28/001* (2013.01); *C04B 2111/0087* (2013.01); *C04B 2111/00939* (2013.01)

(58) Field of Classification Search
  CPC .................. C04B 14/042; C04B 14/20; C04B 2111/0087; C04B 2111/00939; B22C 1/02; B22C 1/10; B22C 1/18; B22C 9/02
  See application file for complete search history.

(56) References Cited

U.S. PATENT DOCUMENTS

| | | |
|---|---|---|
| 2003/0101907 A1 | 6/2003 | Brown |
| 2013/0032689 A1 | 2/2013 | Haanepen et al. |

OTHER PUBLICATIONS

International Search Report and Written Opinion issued Nov. 9, 2017, in International Application No. PCT/US2017/048316 (12 pgs.).

\* cited by examiner though other orders of addition are contemplated, e.g., adding the inorganic binding agent to the high aspect ratio silicate, or mixing the inorganic binding agent and high aspect ratio silicate simultaneously. The method may further include casting a metal or metal alloy using the mold.

COMPOSITIONS COMPRISING SILICATES AND METHODS OF USE THEREOF IN SAND CASTING

CLAIM FOR PRIORITY

This application is a U.S. national phase entry of International Application No. PCT/US2017/048316, filed Aug. 24, 2017, which claims the benefit of priority of U.S. Provisional Application No. 62/379,461, filed Aug. 25, 2016, to both of which this application claims the benefit of priority, and the entirety of the subject matter of both of which is incorporated herein by reference.

TECHNICAL FIELD

Embodiments of the present disclosure relate generally to compositions useful for forming sand molds and methods of use thereof, e.g., in sand casting.

BACKGROUND

Casting is a foundry process for preparing articles in which a heated liquid material, often a metal or metal alloy, is poured into the cavity of a mold and allowed to cool in the shape of the cavity. The casted article is then released from the mold. Various materials can be used to form the mold, e.g., depending on the nature of the material to be cast. Sand casting, for example, is useful for casting metals and metal alloys. In this process, sand is typically combined with a binding agent and formed into the desired mold shape. Forming such sand molds can be done by compacting the sand mixture around a pattern (e.g., a replica of the article to be cast) and removing the pattern to leave a cavity with the desired shape and configuration. Once molten metal is introduced into the mold and cooled to solidify, the casted metal article may be released, often by breaking down the sand mold.

Green sand casting refers to the use of wet or moistened sand to form the mold, wherein sand is typically combined with water and an inorganic binding agent such as clay to form the molding medium. The binding agent generally allows the sand particles to cohere, such that the mold can maintain its shape and withstand stress applied throughout the casting process. During green sand casting, the sand mold typically retains some amount of moisture, with clay serving as an adhesive at both ambient and elevated temperatures. Binder mixtures are sometimes provided as a "pre-mix," which can be combined with a local source of sand to produce the molding medium.

The chemical composition of the sand mold generally dictates its properties, including its ability to withstand the stress and pressure of the casting process, which in turn, affects the quality of the cast article. Different compositions of sand molding medium can have a significant impact on the ability of the mold to perform under the high temperature, compression conditions during sand casting.

SUMMARY OF THE DISCLOSURE

The present disclosure includes compositions useful in sand casting, including green sand casting, preparation of such compositions, and methods of use thereof.

For example, the present disclosure includes composition comprising at least one aggregate, at least one inorganic binding agent, and at least one high aspect ratio silicate. In some aspects, the composition may comprise, by weight relative to the total weight of the composition, from about 80% to about 95% aggregate, from about 5.0% to about 15.0% inorganic binding agent, and from about 0.1% to about 5.0% high aspect ratio silicate. The high aspect ratio silicate may comprise, for example, mica and/or talc. Exemplary mica minerals suitable for the composition include muscovite, paragonite, lepidolite, phlogopite, biotite, and combinations thereof. According to some aspects of the present disclosure, the high aspect ratio silicate has an aspect ratio greater than 10, such as an aspect ratio ranging from 10 to 1000, from 20 to 100, or from 40 to 80. In some examples, the high aspect ratio silicate may have a $d_{50}$ particle diameter ranging from about 50 μm to about 100 μm.

The composition may comprise, e.g., from about 0.5% by weight to about 3.0% by weight of the high aspect ratio silicate, relative to the total weight of the composition. Additionally or alternatively, the composition may comprise from about 5.0% by weight to about 10.0% by weight, or from about 5.0% by weight to about 8.0% by weight, of the inorganic binding agent relative to the total weight of the composition. In some examples, the inorganic binding agent(s) may comprise at least one clay chosen from bentonite, fireclay, or a mixture thereof. In at least one example, the inorganic binding agent comprises bentonite. In at least one example, the inorganic binding agent does not comprise ball clay. In at least one example, the inorganic binding agent does not comprise kaolin. Further, the composition may comprise from about 85% by weight to about 95% by weight, or from about 90% by weight to about 95% by weight, of the aggregate, relative to the total weight of the composition. Exemplary aggregates suitable for the composition may include, but are not limited to, silica sand, zircon sand, an aluminosilicate, or a combination thereof. The aggregate(s) may have a homogeneous chemical composition, e.g., each particle comprising the same or substantially the same material, or a heterogeneous chemical composition, e.g., each particle comprising a combination of materials aggregated together to form a single particle. In at least one example, the composition may comprise, by weight relative to the total weight of the composition: from about 80% to about 95% of a natural sand, a synthetic sand, or a combination thereof, from about 5.0% to about 15.0% of a clay, and from about 0.1% to about 5.0% of mica, talc, or a combination thereof.

The composition may further one or more additional organic or inorganic materials. For example, the composition may further comprise graphite, one or more organic materials, and/or one or more other minerals. In at least one example, the composition further comprises from about 0.1% by weight to about 7.0% by weight of an organic material, relative to the total weight of the composition and/or from about 0.1% by weight to about 5.0% by weight of another mineral, relative to the total weight of the composition. According to some aspects of the present disclosure, the composition may comprise water, e.g., providing for a moisture content ranging from about 1.0% to about 4.0% by weight, relative to the total weight of the composition.

The present disclosure further includes methods of sand casting using any of the compositions described above or elsewhere herein. For example, the method of sand casting may comprise preparing the composition by combining the aggregate, the inorganic binder, and the high aspect ratio silicate with water; and preparing a mold by forming the composition into a shape. The step of preparing the composition may include, e.g., adding the high aspect ratio silicate to the inorganic binding agent to form a mixture, wherein the high aspect ratio silicate comprises from 50% to 100% mica by weight; and combining the mixture with the water and the aggregate. The step of preparing the mold may include, e.g., forming the composition around a pattern, and removing the pattern to leave a cavity.

According to some aspects of the present disclosure, the composition may have a green compression strength ranging from about 5.0 N/cm$^2$ to about 25.0 N/cm$^2$, such as from about 10.0 N/cm$^2$ to about 18.0 N/cm$^2$, or from about 15.0 N/cm$^2$ to about 20.0 N/cm$^2$. Additionally or alternatively, the composition may have a squeeze pressure of 170 g of the composition less than 300 pounds per square inch (PSI) (about 206.8 N/cm$^2$), or less than 280 PSI (about 193.1 N/cm$^2$). The method may further comprise introducing a metal or metal alloy into the mold to form a casted article, and removing the casted article from the mold.

The present disclosure further includes methods of molding an article. For example, the method may comprise introducing a heated material into a mold, wherein the mold comprises any of the composition described above or elsewhere herein, and allowing the heated material to cool. The heating material may comprise, for example, a metal or metal alloy.

BRIEF DESCRIPTION OF THE DRAWINGS

The accompanying drawings, which are incorporated in and constitute a part of this specification, illustrate various exemplary aspects of the disclosure, and together with the description, serve to explain the principles of the present disclosure.

DETAILED DESCRIPTION

Figure 1A:
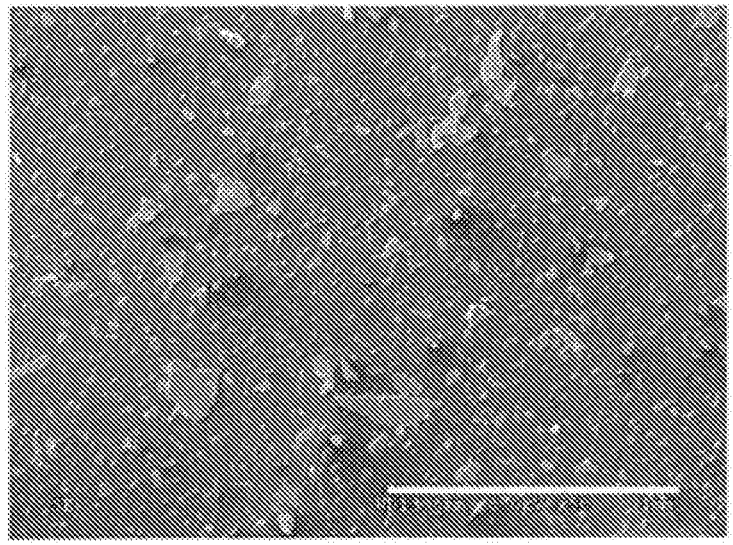
FIGS. 1A and 1B show SEM images of mica samples discussed in Example 1.

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an," and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

Compositions according to the present disclosure may comprise one or more inorganic binding agents and one or more high aspect ratio silicates. Without being bound by theory, it is believed that incorporating the high aspect ratio silicate(s) in the compositions herein may provide for a mold with a high degree of mold integrity and/or an improved quality of a cast article produced by the mold. For example, the compositions may provide a smoother surface on the cast article and/or fewer surface defects in comparison to other compositions lacking the high aspect ratio silicate(s). In at least one example, the inorganic binding agent may comprise one or more clays, and the high aspect ratio silicate may comprise mica, talc, or a combination thereof.

The term "high aspect ratio silicate" includes silicate minerals having a generally platy or sheet-like structure that cleaves between adjacent layers. The aspect ratio (p) of a particle may be defined as the length along the particle's major axis divided by the width. Such silicates may have an aspect ratio of at least 10, such as, e.g., an aspect ratio between 10 and 1000. For example, the compositions herein may comprise a silicate having an aspect ratio ranging from about 10 to about 1000, from about 10 to about 500, from about 10 to about 250, from about 10 to about 200, from about 10 to about 150, from about 20 to about 100, from about 20 to about 80, from about 30 to about 100, from about 40 to about 100, from about 40 to about 80, or from about 50 to about 70, e.g., an aspect ratio of about 20, about 25, about 30, about 35, about 40, about 45, about 50, about 55, about 60, about 65, about 70, about 75, or about 80.

Exemplary high aspect ratio silicates suitable for the compositions herein include, but are not limited to, mica and talc. Many micas have the general formula $X_2Y_{4-6}Z_8O_{20}(OH,F)_4$, wherein X is K, Na, or Ca; Y is Al, Mg, or Fe; and Z is Si, Al, Fe$^{3+}$, or Ti, although micas may include Ba, Cs, Fe$^{2+}$, Li, Cr, Mn, V, Zn, Be, or a combination thereof. Mica minerals suitable for the compositions herein include, but are not limited to, muscovite, paragonite, phlogopite, biotite, and combinations thereof. Talc is magnesium silicate, e.g., having the chemical formula $Mg_3Si_4O_{10}(OH)_2$. Additional silicate minerals are also contemplated, including, e.g., minerals of the chlorite group. In some aspects of the present disclosure, the high aspect ratio silicate is not kaolin. In some aspects of the present disclosure, the high aspect ratio silicate is not montmorillonite.

The particle size of the high aspect ratio silicate may be characterized in terms of the diameter of a sphere of equivalent diameter ("equivalent spherical diameter" (ESD)) that sediments through a fully dispersed suspension of the particles in an aqueous medium. For example, a particle characterization instrument may be used to obtain the particle size distribution by plotting the cumulative percentage by weight of particles having a given ESD. For example, $d_{50}$ is the particle ESD at which 50% by weight of the particles have a smaller ESD. The high aspect ratio silicates of the present disclosure may have a $d_{50}$ particle diameter ranging from about 25 μm to about 150 μm, such as from about 40 μm to about 125 μm, from about 50 μm to about 100 μm, from about 60 μm to about 80 μm, or from about 65 μm to about 75 μm. For example, the composition may comprise at least one high aspect ratio silicate having a $d_{50}$ particle diameter of about 50 μm, about 55 μm, about 58 μm, about 60 μm, about 62 μm, about 65 μm, about 68 μm, about 70 μm, about 72 μm, about 75 μm, about 78 μm, or about 80 μm.

Compositions according to the present disclosure may comprise from about 0.1% to about 5.0% by weight of a high aspect ratio silicate, with respect to the total weight of the composition, such as from about 0.1% to about 4.8% by weight, from about 0.2% to about 4.5% by weight, from about 0.5% to about 4.0% by weight, from about 0.8% to about 3.8% by weight, from about 1.0% to about 3.5% by weight, from about 1.2% to about 3.0% by weight, from about 1.5% to about 3.0% by weight, from about 1.8% to about 2.8% by weight, from about 2.0% to about 2.5% by weight. For example, the composition may comprise about 0.5%, about 1.0%, about 1.2%, about 1.5%, about 1.8%, about 2.0%, about 2.1%, about 2.2%, about 2.3%, about 2.4%, or about 2.5% by weight of a high aspect ratio silicate, with respect to the total weight of the composition.

According to some aspects of the present disclosure, the high aspect ratio silicate may comprise at least 50% mica by weight (from 50% to 100% by weight) with respect to the total weight of the high aspect ratio silicate. For example, the high aspect ratio silicate may comprise at least 60%, at least 70%, at least 80%, at least 85%, at least 90%, at least 95%, or more than 95% mica by weight, e.g., about 100% mica by weight. For example, the high aspect ratio silicate may comprise less than 5%, less than 2%, or less than 1% by weight material(s) other than mica.

In some examples, the composition may comprise one or more clays serving as the inorganic binding agent(s). Clay is a generic term that encompasses a range of hydrous aluminosilicate minerals of varying chemical composition and properties. Dampened clay is generally tenacious and plastic, whereas dried clay becomes hard, particularly when dried at elevated temperatures. Clay may serve as a binder by providing plasticity, workability, and/or strength to the molding medium. For example, the plasticity of a clay or combination of clays may help to maintain the integrity of a sand mold upon the application of forces during sand casting. Exemplary binding agents suitable for the compositions herein include, but are not limited to, bentonite, fireclay, and combinations thereof.

One of the main components of bentonite is montmorillonite, a phyllosilicate clay having a layered structure of an octahedral sheet of alumina between two tetrahedral sheets of silica. The different types of bentonite are named after the dominant compositional element, such as potassium bentonite, sodium bentonite, calcium bentonite, and aluminum bentonite. In some aspects, the composition may comprise sodium bentonite, or a mixture of sodium bentonite and calcium bentonite. Bentonite may provide plasticity to the composition and may be capable of withstanding the higher temperatures of sand casting without altering its chemical structure. Fire clay is a refractory clay also able to withstand high temperatures and generally used in ceramics manufacturing. Additional clay materials having a suitable binding capability for preparing a sand mold are also contemplated for the compositions herein.

According to some aspects of the present disclosure, the composition may comprise from about 5.0% to about 20.0% by weight of at least one inorganic binding agent, with respect to the total weight of the composition, such as from about 5.0% to about 17.5% by weight, from about 5.0% to about 15.0% by weight, from about 5.0% to about 12.5% by weight, from about 5.0% to about 10.0% by weight, or from about 5.0% to about 8.0% by weight. For example, the composition may comprise about 5.0%, about 8.0%, about 10.0%, about 12.0%, or about 15.0% by weight of an inorganic binding agent, with respect to the total weight of the composition. In at least one example, the inorganic binding agent does not comprise ball clay. In at least one example, the inorganic binding agent does not comprise kaolin.

The compositions herein may further comprise at least one aggregate, such as a natural or synthetic sand or sand composite material, e.g., such that the mixture of inorganic binding agent(s), high aspect ratio silicate(s), and aggregate(s) may serve as a molding medium. The term "aggregate" as used herein includes homogeneous materials, e.g., particles each comprising the same or substantially the same composition, as well as heterogeneous or composite particles, e.g., comprising materials of different compositions aggregated into a single particle. Examples of aggregates that may be used in the compositions herein include, but are not limited to, silica sand ($SiO_2$), chromite sand ($FeCr_2O_4$), and zircon sand ($ZrSiO_4$), any of which optionally may include other elements such as magnesium, aluminum, manganese, and/or carbon (graphite). Other types of sand and other aggregates are likewise contemplated and may be used in the compositions herein without departing from the principles of the present disclosure. The composition and gradation of sand may be selected based at least in part on the composition of the material to be cast, the temperature of casting, and/or the availability of sand or other aggregates obtained from a local source. The cohesive strength of the composition serving as a molding medium may be most evident in its "green" condition, that is, when it is moistened.

According to some aspects of the present disclosure, the composition may comprise from about 75% to about 95% by weight of at least one aggregate, with respect to the total weight of the composition, such as from about 80% to about 95% by weight, from about 85% to about 95% by weight, from about 85% to about 90% by weight, or from about 90% to about 95% by weight, with respect to the total weight of the composition.

The compositions according to the present disclosure may include one or more other materials or additives. Examples of such additives suitable for the green sand compositions herein include, but are not limited to, graphite, organic carbon compounds (e.g., coal, gilsonite, organic pitch), polymers, surfactants, iron oxide, cellulose (e.g., ground plant products), corn cereal, and starches. Without intending to be bound by theory, it is generally believed that carbonaceous materials and/or other additives may provide several benefits in green sand casting.

For example, carbonaceous material on and immediately adjacent the mold cavity surface may decompose under the heat of the molten metal as it is poured into the mold. A product of this decomposition is elemental carbon (e.g., graphite) at the interface between the mold cavity and molten metal, which can help in releasing the cast article from the mold (e.g., shakeout) and produce a smoother surface on the cast article as mentioned above. Further, for example, carbonaceous material(s) may increase flowability of the molding medium and/or increase the permeability of the mold. Exemplary carbonaceous materials that may be useful in the compositions herein include, but are not limited to, leonardite, lignite, causticized lignite, coal including bituminous coal such as, e.g., sea coal (a finely-ground type of bituminous coal), Flocarb® (a naturally-occurring organic material produced by Amcol), graphite, lustrous carbon formers (e.g., gilsonite, pitch, organic by-products, polymers), petroleum pitch, and combinations thereof.

According to some aspects of the present disclosure, the composition may comprise the high aspect ratio silicate(s) in combination with graphite. For example, the composition may comprise from about 0.1% to about 5.0% by weight or from about 1.0% to about 3.0% by weight of at least one high aspect ratio silicate, with respect to the total weight of the composition, and from about 0.1% to about 3.0% by weight or from about 0.5% to about 2.0% by weight graphite, with respect to the total weight of the composition. In other examples, the high aspect ratio silicate may provide an alternative to graphite. For example, the high aspect ratio silicate may provide for castings at substantially the same or better quality than graphite at a lower cost compared to graphite. Further, for example, the high aspect ratio silicate may be easier to transport and/or incorporate into the manufacturing process, e.g., avoiding the difficulty of handling graphite and the risk of a spill when transferring graphite.

In some examples, a "pre-mix" or binder composition comprising an inorganic binding agent and a high aspect ratio silicate may be prepared and combined with the aggregate(s) and any additives, and moistened with water to produce a molding composition, e.g., a green sand composition. For example, a high aspect ratio silicate may be added to an inorganic binding agent to form a mixture, and the mixture may be combined with water, an aggregate, and any additives. For example, the binder composition may comprise bentonite as the inorganic binding agent and mica as the high aspect ratio silicate. Alternatively, the molding composition may be prepared by combining, in any order, the inorganic binding agent(s), high aspect ratio silicate(s), aggregate(s), additives, and water. For example, the method may comprise adding a high aspect ratio silicate to an aggregate, and then adding an inorganic binding agent, any additives, and water. The binding agent(s), high aspect ratio silicate(s), aggregate(s), water, and any additives may be combined or mulled together, e.g., via a muller or using another suitable machine or method for providing a uniform molding medium.

Moistening the composition with water may activate the binding properties of the binding agent(s) for forming the composition into a sand mold. The water may provide for a moisture content of the molding composition ranging from about 1.0% to about 7.0% by weight with respect to the total weight of the molding composition, such as from about 1.5% to about 5.0% by weight, from about 1.8% to about 3.5% by weight, from about 1.8% to about 2.5% by weight, from about 1.8% to about 2.2% by weight, or from about 2.0% to about 2.4% by weight, e.g., a moisture content of about 1.8%, about 1.9%, about 2.0%, about 2.1%, about 2.2%, about 2.3%, about 2.4%, or about 2.5% by weight.

In at least one example, the composition may comprise from about 80% to about 95% by weight sand (e.g., silica sand), from about 5.0% to about 15.0% by weight bentonite (e.g., sodium bentonite, calcium bentonite, or a combination thereof), and from about 0.1% to about 5.0% by weight mica (e.g., phlogopite mica, muscovite mica, or a combination thereof), with respect to the total weight of the composition. In another example, the composition comprises from about 90% to about 95% by weight sand (e.g., silica sand), from about 5.0% to about 8.0% by weight bentonite (e.g., sodium bentonite, calcium bentonite, or a combination thereof), and from about 1.8% to about 2.2% by weight mica (e.g., phlogopite mica, muscovite mica, or a combination thereof), with respect to the total weight of the composition.

The composition may comprise one or more clay materials, one or more high aspect ratio silicates, one or more aggregates, and at least one other mineral. Such other minerals may be naturally-occurring or synthetic, and may include, but are not limited to, soda ash and other inorganic minerals. The other mineral(s) may make up from about 0.1% to about 5.0% by weight with respect to the total weight of the composition.

The loss-on-ignition (LOI) value is the difference in weight of a material before and after heating it at a high temperature ("igniting" the material), in particular the temperatures used during casting. For example, cast iron generally requires a temperature of about 1427° C. (~2600° F.). The LOI provides an indication of the amount of combustible material in the sand mold, e.g., reflecting the amount of organic material that volatilizes and decomposes upon heating. For a green sand composition, the combustible materials contained therein may consume water added to activate the binding agent(s). LOI measurements therefore can provide useful information about the composition and overall quality of the sand molding medium.

Methods of preparing or forming a sand mold according to the present disclosure may include use of a pattern or replica of the article to be cast with the mold. The pattern may be formed of plastic, wood, metal, or other suitable material or combination of materials. In some aspects, for example, green sand as discussed above may be shaped around the pattern such that the green sand adopts the shape of the pattern. The pattern then may be removed to form the mold by leaving a cavity in the shape of the pattern. In other aspects, the pattern may be pressed into the green sand and then removed, forming the mold by leaving a cavity in the shape of the pattern.

The chemical composition and physical characteristics of the molding composition may affect its "workability" and ability to compact around the pattern, as well as other metrics used to assess the integrity of a sand mold. The standard sample size for testing a molding composition is a cylinder having a diameter of 50.8 mm (2 in.) and a height of 50.8 mm (i.e., a 2-inch by 2-inch cylindrical sample).

Flowability generally refers to the capacity of the molding medium to flow freely around the pattern, e.g., to provide an appropriate density (e.g., ease with which densification may be attained) while avoiding voids at the sand/mold interface that can reduce the quality of the casted article. Molding compositions according to the present disclosure may have a flowability that overcomes friction between the molding composition and the surface of the pattern while providing the appropriate amount of contact with the pattern to provide for high mold strength.

After being compacted to define a cavity, molding compositions according to the present disclosure may have sufficient strength to withstand any forces incident to removal of the pattern, such that the cavity design or configuration remains intact. The molding compositions also may have sufficient strength to withstand the forces incident to moving and positioning the sand mold as it is being formed and/or any hydraulic forces incident to pouring the heated material (e.g., molten metal or metal alloy) into the cavity.

The sand mold may be incorporated into a gating system, or other suitable system or mechanism, for introducing a heated liquid material such as a molten metal or metal alloy into the cavity. The heated liquid material thus may be poured into the mold cavity with the appropriate rate of flow and temperature upon entering the cavity. Exemplary materials that may be used for the casted articles herein include, but are not limited to, iron, aluminum, steel, bronze, brass, magnesium, zinc, and combinations thereof.

The green sand mold may be at least partially dried upon introduction of the heated material into the cavity. The mold may have sufficient permeability to help in preventing damage to the mold upon heating. As the heated material is poured into the mold cavity, air and/or other gases may be displaced through the molding medium. Because the molding composition is moistened, steam may be generated upon exposure to the heated material, for example. To accommodate the generation of air and/or other gaseous materials generated upon heating, the molding composition used to form the sand mold may have a suitable permeability that allows the gas to vent with a minimum of gas flow resistance in order to preserve the integrity of the mold.

In some aspects, the sand mold may have a relatively high gas permeability. Permeability may be measured using American Foundry Society procedures (AFS Mold and Core Test handbook). For example, permeability may be determined by measuring the flow rate of air passing through a sample under standard pressure, where a higher permeability value corresponds to a greater capacity to vent gas as the mold is heated. Compositions according to the present disclosure may have a permeability ranging from about 50 to about 250 units, such as from about 75 to about 225 units, from about 100 to about 200 units, from about 120 to about 200 units, from about 130 to about 190 units, or from about 140 to about 170 units. After pouring the heated liquid material into the mold cavity, the liquid may be allowed to cool such that the cooled material adopts the shape of the cavity. The casted article thus formed may be removed from the sand mold by any suitable method, such as breaking away the sand mold.

As mentioned above, incorporating one or more high aspect ratio silicates into the molding medium may improve the quality of the casted article, e.g., by reducing the number of casting defects or the propensity towards casting defects such as scabs (e.g., irregular crusts on the surface of a casted article), penetration of the casting material into the sand mold, burn on or burn in of sand onto the surface of the casted article, and/or other defects associated with expansion. For example, the molding compositions of the present disclosure may enhance the integrity of the sand mold while maintaining appropriate properties of the molding medium.

Various analyses may be used to characterize green sands and green sand molds to assess their capacity to produce casted articles with the appropriate quality. In addition to the flowability and permeability characteristics described above, green sand molds may be described by their green compression strength, green shear strength, dry compression strength, hot compression strength, friability, and cone jolt toughness. The sample size used for these analyses may be the same standard cylindrical shape mentioned above for permeability analysis (a cylindrical sample having a diameter of 2 in. and a height of 2 in.).

Squeeze pressure refers to the amount of pressure applied to prepare a sample specimen. The compositions herein may have a lower squeeze pressure as compared to compositions that do not comprise a high aspect ratio silicate. For example, the compositions herein may have a squeeze pressure for compacting a 170-g sample into a standard 2-inch by 2-inch test specimen less than 300 PSI (about 206.8 N/cm$^2$) or less than 280 PSI (about 193.1 N/cm$^2$). For example, the squeeze pressure of 170 g of the composition may range from 180 PSI (about 124.1 N/cm$^2$) to 300 PSI (about 206.8 N/cm$^2$), such as from 190 PSI (131 N/cm$^2$) to 280 PSI (about 193.1 N/cm$^2$), from 200 PSI (about 137.9 N/cm$^2$) to 250 PSI (about 172.4 N/cm$^2$), or from 210 PSI (~144.8 N/cm$^2$) to 240 PSI (about 165.5 N/cm$^2$).

Green compression strength refers to the pressure required to rupture a sample at compressive loading, while green shear strength refers to the force required to shear a sample along its axis. Compositions according to the present disclosure may have a green compression strength from about 5.0 N/cm$^2$ to about 20.0 N/cm$^2$, such as from about 10.0 N/cm$^2$ to about 18.0 N/cm$^2$, or from about 15.0 N/cm$^2$ to about 20.0 N/cm$^2$. Further, compositions according to the present disclosure may have a green shear strength ranging from about 1.0 N/cm$^2$ to about 8.0 N/cm$^2$, such as from about 2.0 N/cm$^2$ to about 7.0 N/cm$^2$, or from about 3.0 N/cm$^2$ to about 7.0 N/cm$^2$.

The compositions herein may provide for a relatively high green compression strength per amount of squeeze pressure used to compact a sample specimen. For example, for a squeeze pressure of about 100 PSI (~68.9 N/cm$^2$) or about 150 PSI (~103.4 N/cm$^2$), the composition may have a green compression strength greater than 10.0 N/cm$^2$, e.g., a green compression strength ranging from about 10.0 N/cm$^2$ to about 18.0 N/cm$^2$, or from about 12.0 N/cm$^2$ to about 16.0 N/cm$^2$.

Drying of a green sand mold may occur relatively quickly in some cases, e.g., while the material for casting is still molten and continues to exert hydraulic forces on the structure of the mold. Dry strength compression provides an indication of the ability of the molding medium to ensure that the mold retains its strength and integrity throughout the entire casting process. Green sands according to the present disclosure may have a dry compression strength ranging from about 10.0 N/cm$^2$ to about 50.0 N/cm$^2$, such as from about 15.0 N/cm$^2$ to about 40.0 N/cm$^2$, or from about 20 N/cm$^2$ to about 30.0 N/cm$^2$.

Permeability is relevant to the fact that both the green compression strength and dry compression strength of the molding composition are proportional to the density of the composition after it has been compacted to define a mold cavity. In some aspects of the present disclosure, the composition may have a workability characteristic that facilitates obtaining a relatively high and consistent density of the compacted sand.

Hot compression strength evaluates a green sand sample's performance under elevated temperatures as an indication of the ability of the sand mold to maintain its shape throughout the sand casting process. Compositions according to the present disclosure may have a hot compression strength ranging from about 50.0 PSI (~34.5 N/cm$^2$) to about 200.0 PSI (~137.9 N/cm$^2$), such as from about 60.0 PSI (~41.4 N/cm$^2$) to about 150.0 PSI (~103.4 N/cm$^2$), or from about 75.0 PSI (~51.7 N/cm$^2$) to about 125.0 PSI (~86.2 N/cm$^2$) when measured at a temperature between 950° C. and 1100° C. Hot compression strength may be measured using American Foundry Society procedures (AFS Mold and Core Test handbook).

Wet tensile strength is a useful metric for determining the ability of the sand mold to resist scabbing, or the undesirable formation of projections or roughness on casted articles. During casting, water from the sand adjacent to the molten metal is driven back, creating a condensation zone between the dry and wet sand. The strength of the sand in this layer is considered the wet tensile strength. Higher wet tensile values correspond to less propensity towards scabbing. Green sands according to the present disclosure may have a wet tensile strength ranging from about 0.100 N/cm$^2$ to about 0.650 N/cm$^2$, such as from about 0.250 N/cm$^2$ to about 0.550 N/cm$^2$, or from about 0.350 N/cm$^2$ to about 0.500 N/cm$^2$.

Friability measures the surface brittleness and abrasion resistance of green sand on various surfaces of the sand mold. Higher clay levels generally reduce friability, since loose sand can result in sand inclusion defects on casting surfaces. The compositions herein may provide for green sand molds having lower friability relative to those formed from bentonite clays alone. Friability is related to the "brittleness" of a prepared molding sand. Friability is generally inversely related to compactability, where a decrease in compactability or brief air-drying period may result in an increase in friability. Compositions according to the present disclosure may have a friability ranging from about 1.0% to about 20.0%, such as from about 2.0% to about 15.0%, or from about 3.0% to about 6.0%.

Cone jolt toughness measures the ability of green sand to absorb energy by repeatedly applying stress to a green sand sample and measuring the point at which the sample splits. Cone jolt toughness generally refers to the integrity of a mold. In a typical test, a green sand sample is automatically picked up and dropped to measure the number of jolts versus displacement of the sample. The test may conclude when the sample splits or measures a vertical displacement of 1.25 mm (0.05 in.). Green sands according to the present disclosure may have a cone jolt toughness ranging from 10 jolts to 50 jolts, such as 20 jolts to 45 jolts, or 30 jolts to 40 jolts. Certain additives incorporated into the molding medium may help to increase the cone jolt toughness of the sand mold. In some aspects of the present disclosure, for example, corn cereal and/or starch may be added to the green sand composition.

Other aspects and embodiments of the present disclosure will be apparent to those skilled in the art from consideration of the specification and practice of the embodiments disclosed herein.

EXAMPLES

The following examples are intended to illustrate the present disclosure without, however, being limiting in nature. It is understood that the present disclosure encompasses additional aspects and embodiments consistent with the foregoing description and following examples.

Example 1

Figure 1B:
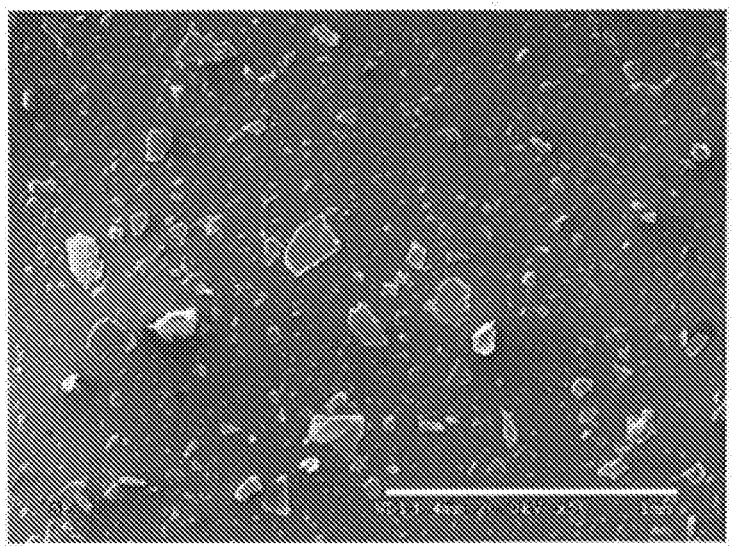

The chemical and physical characteristics of two muscovite micas (A and B) were analyzed with results summarized in Table 1. Particle size distributions used to determine the $d_{10}$, $d_{50}$, and $d_{90}$ diameters were obtained with a Microtrac particle characterization instrument. Loss on ignition was measured at 1050° C. Chemical composition was measured by X-ray fluorescence (XRF). FIGS. 1A and 1B show images of the two samples taken by scanning electron microscopy (SEM) at 50× magnification and 8.0 kV, wherein FIG. 1A shows mica A and FIG. 1B shows mica B.

TABLE 1

|  | Mica A | Mica B |
| --- | --- | --- |
| $d_{10}$ (μm) | 23.6 | 28.1 |
| $d_{50}$ (μm) | 68.7 | 71.5 |
| $d_{90}$ (μm) | 151.7 | 154.7 |
| LOI (%) | 4.0 | 1.90 |
| $SiO_2$ (wt %) | 43.2 | 41.2 |
| MgO (wt %) | 20.6 | 21.2 |
| $Al_2O_3$ (wt %) | 12.1 | 13.4 |
| $K_2O$ (wt %) | 7.4 | 9.0 |
| $Fe_2O_3$ (wt %) | 6.1 | 5.8 |
| CaO (wt %) | 4.1 | 1.5 |
| $TiO_2$ (wt %) | 1.4 | 1.7 |
| BaO (wt %) | 0.7 | 0.4 |
| F (wt %) | 0.5 | 0.7 |
| $Na_2O$ (wt %) | 0.5 | 0.4 |
| $P_2O_5$ (wt %) | 0.5 | 0.2 |
| $Cr_2O_3$ (wt %) | 0.3 | 0.3 |
| S (wt %) | 0.1 | — |

Example 2

Green sand compositions 1-6 were prepared according to Table 2 below to compare the effects of mica and talc to those of graphite, a traditional green sand additive. Composition 3 was prepared with muscovite mica with kaolin contamination due to the mica being sourced from kaolin deposits in Georgia. Compositions 4 and 6 were prepared with different samples of phlogopite mica from Canada, and Composition 5 was prepared with muscovite mica from North Carolina. Compositions 7 and 8 were prepared with different samples of talc, wherein the talc particles of Composition 7 were of a different size that the talc particles of Composition 8.

TABLE 2

| Compositson | 1 | 2 | 3 | 4 | 5 | 6 | 7 | 8 |
| --- | --- | --- | --- | --- | --- | --- | --- | --- |
| graphite (wt %) | — | 2 | — | — | — | — | — | — |
| mica (wt %) | — | — | 2 | 2 | 2 | 2 | — | — |
| talc (wt %) | — | — | — | — | — | — | 2 | 2 |
| moisture (%) | 2.3 | 2.2 | 2.1 | 2.3 | 2.3 | 2.2 | 2.4 | 2.4 |
| compactability (%) | 45 | 45 | 45 | 45 | 44 | 45 | 46 | 47 |

Each composition was prepared by combining 286 g of Wyoming bentonite clay (comprising naturally-occurring sodium bentonite) with 3800 g of sand and the mica, talc, or graphite (if any) in a muller and mixing for 1 minute. Then a quantity of water was added to achieve 44-46% compactability. The mechanical mixing was continued for 7 minutes, for a total mixing time of 8 minutes. The mixture was transferred to a plastic bag and closed to prevent loss of moisture.

After the mechanical mixing, four portions of each composition (155 g, 160 g, 165 g, and 170 g) were formed into standard 2-inch by 2-inch cylinders for measuring squeeze pressure, permeability, and green compression strength according to the standards and testing procedures prescribed by the American Foundry Society (AFS). The squeeze pressure refers to the pressure applied to prepare the test specimen for each sample mass. Results appear in Table 3.

TABLE 3

| Composition | 1 | 2 | 3 | 4 | 5 | 6 | 7 | 8 |
| --- | --- | --- | --- | --- | --- | --- | --- | --- |
| Squeeze pressure (PSI) | | | | | | | | |
| 155 g sample | 50 | 45 | 35 | 40 | 40 | 40 | 55 | 40 |
| 160 g sample | 85 | 75 | 55 | 60 | 65 | 60 | 90 | 55 |
| 165 g sample | 170 | 125 | 100 | 105 | 110 | 95 | 150 | 100 |
| 170 g sample | 350 | 260 | 200 | 210 | 230 | 205 | 290 | 210 |
| Permeability | | | | | | | | |
| 155 g sample | 160 | 167 | 186 | 186 | 177 | 175 | 179 | 171 |
| 160 g sample | 129 | 136 | 148 | 142 | 137 | 144 | 145 | 148 |
| 165 g sample | 102 | 110 | 116 | 114 | 109 | 115 | 116 | 127 |
| 170 g sample | 87 | 87 | 93 | 93 | 85 | 94 | 94 | 100 |
| Green compression strength ($N/cm^2$) | | | | | | | | |
| 155 g sample | 7 | 5.1 | 4.2 | 6.9 | 5.9 | 7.1 | 7.5 | 6.4 |
| 160 g sample | 9.9 | 7.1 | 6.9 | 9.6 | 9 | 8.6 | 11.1 | 8.5 |
| 165 g sample | 13.1 | 9.4 | 8.2 | 11.9 | 12.3 | 12.9 | 14.6 | 10 |
| 170 g sample | 14.5 | 12.7 | 10.8 | 16.4 | 16.9 | 15.9 | 16 | 14 |

Figure 2:
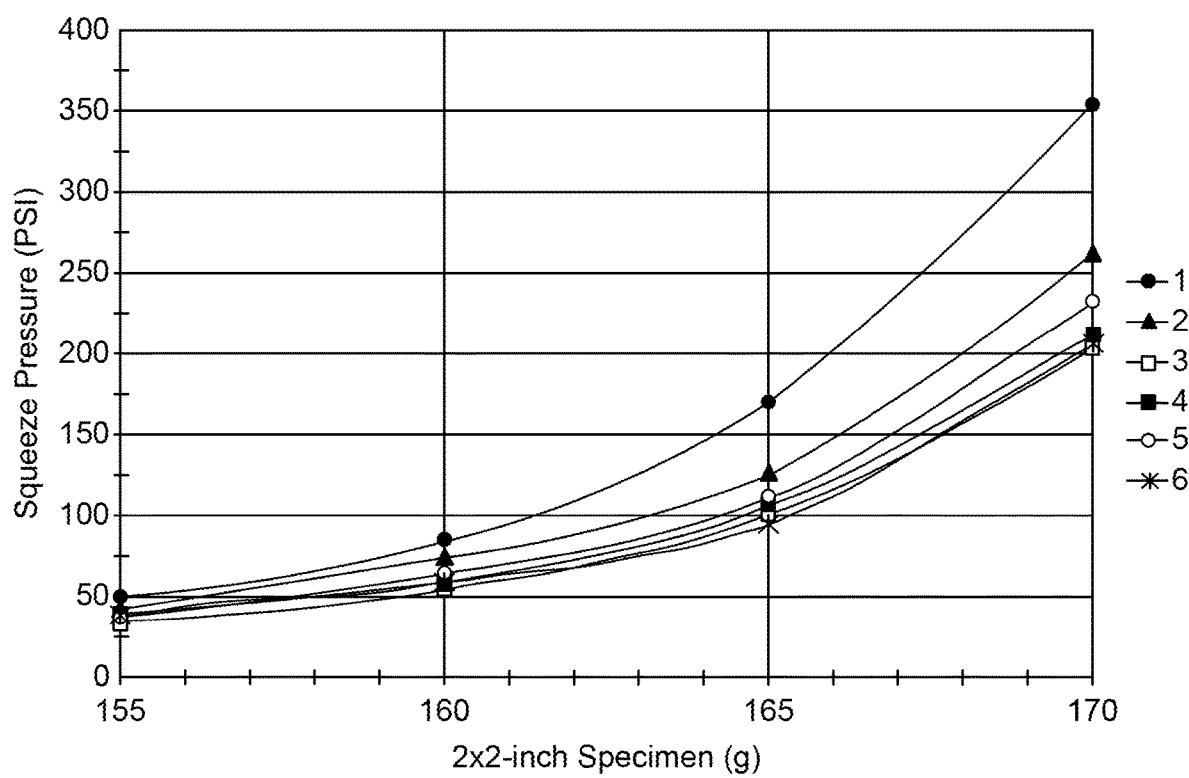
FIGS. 2 and 3 are graphs of test specimen mass (g) vs. squeeze pressure (PSI) for various compositions, as discussed in Example 2.

FIG. 2 shows a graph of the specimen mass vs. squeeze pressure for the clay/sand mixture alone (Composition 1), the graphite sample (Composition 2), and the mica samples (Compositions 3-6). The addition of mica corresponded to a lower squeeze pressure as compared to the clay/sand mixture without mica. Mica was also found to lower squeeze pressure to a greater degree than graphite. Because a lower squeeze pressure is usually desirable in foundry processes, the mica compositions were expected to provide benefits in casting quality. A lower squeeze pressure can allow the molding machine to use less force to prepare the mold, which typically results in a higher integrity mold. The surface of the mold may have fewer imperfections, leading to fewer imperfections in the surface of a casted article and better casting quality.

Figure 3:
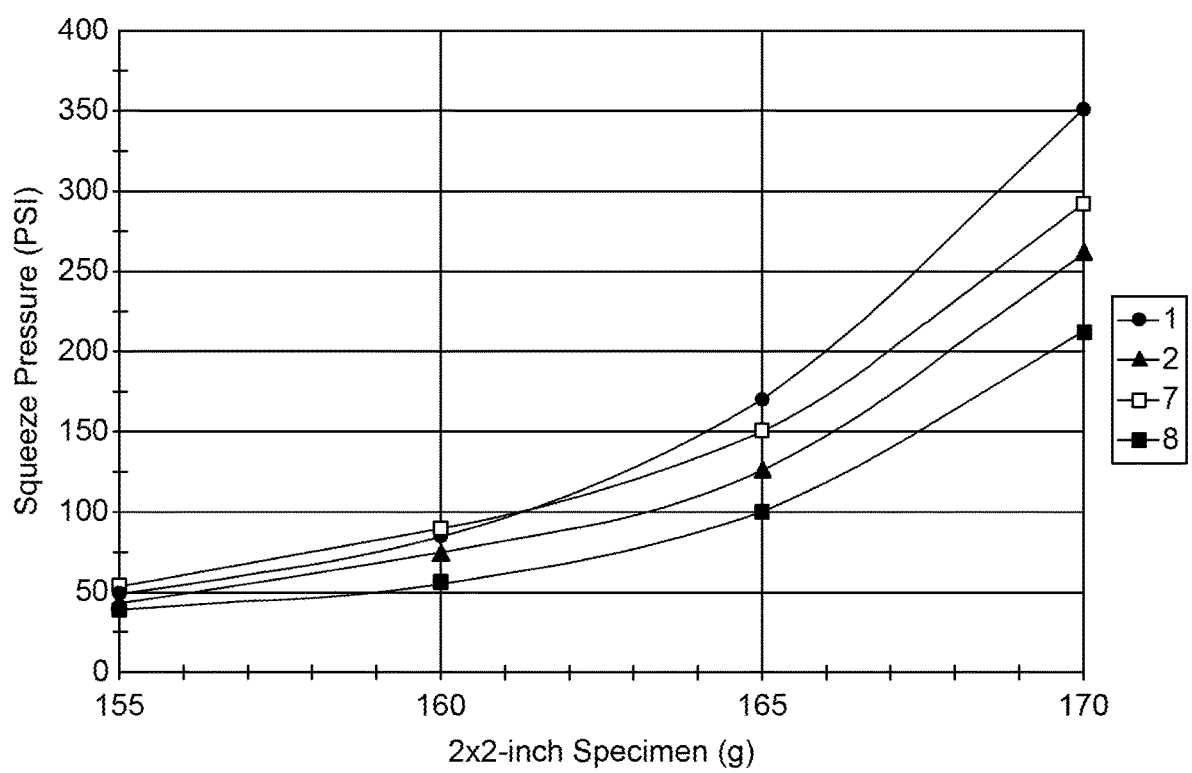

FIG. 3 shows a graph of squeeze pressure for the two talc samples (Compositions 7 and 8) as compared to the clay/sand mixture alone and the graphite sample. While one of the talc compositions, Composition 8, exhibited a lower squeeze pressure than both Compositions 1 and 2, the other talc composition, Composition 7, exhibited a squeeze pressure lower than only Composition 1. This result is believe to be due to the talc of Composition 8 forming a better dispersion within the bentonite, which then provides improved mixing with the sand.

Figure 4:
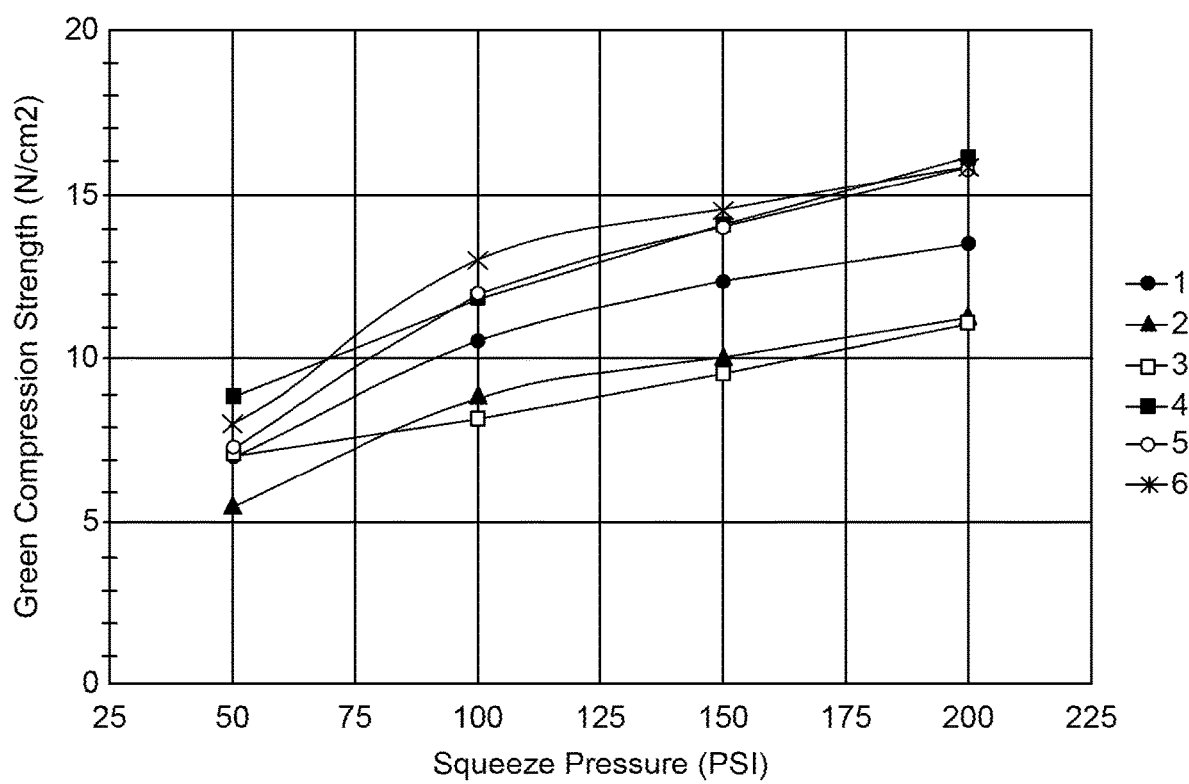
FIG. 4 is a graph of squeeze pressure (PSI) vs. green compression strength (N/cm$^2$) for various compositions, as discussed in Example 2.

FIG. 4 shows a plot of squeeze pressure vs. green compression strength for Compositions 1-6, and illustrates that a relatively high strength (~10-12 N/cm$^2$) was achieved with a relatively lower squeeze pressure (~100 PSI) for the mica compositions.

Example 3

Green sand compositions 9-11 were prepared according to the procedure of Example 2, using a European bentonite clay in place of the Wyoming bentonite clay. The European bentonite comprises a naturally-occurring calcium bentonite that has been activated with sodium (soda ash) and aged for up to three months to be converted into sodium bentonite, whereas the Wyoming bentonite comprises naturally-occurring sodium bentonite. As summarized in Table 4, Composition 9 was prepared as the clay/sand mixture alone (i.e., without mica or graphite), Composition 10 was prepared with 2% phlogopite mica from Canada, and Composition 11 was prepared with 2% graphite. The compositions were tested for squeeze pressure, permeability, and green compression strength as in Example 2. Results appear in Table 5 and FIG. 5.

TABLE 4

| Composition | 9 | 10 | 11 |
| --- | --- | --- | --- |
| graphite (wt %) | — | — | 2 |
| mica (wt %) | — | 2 | — |
| moisture (%) | 2.4 | 2.2 | 2.2 |
| compactability (%) | 46 | 46 | 45 |

TABLE 5

| Composition | 9 | 10 | 11 |
| --- | --- | --- | --- |
| Squeeze pressure (PSI) | | | |
| 155 g sample | 50 | 40 | 40 |
| 160 g sample | 90 | 70 | 65 |
| 165 g sample | 155 | 120 | 110 |
| 170 g sample | 320 | 210 | 190 |
| Permeability | | | |
| 155 g sample | 209 | 188 | 212 |
| 160 g sample | 144 | 148 | 160 |
| 165 g sample | 115 | 120 | 135 |
| 170 g sample | 94 | 101 | 101 |
| Green compression strength (N/cm$^2$) | | | |
| 155 g sample | 6.7 | 9.3 | 5.3 |
| 160 g sample | 11.4 | 12.1 | 7.8 |
| 165 g sample | 14.5 | 15.5 | 12.2 |
| 170 g sample | 18.2 | 17.3 | 15 |

Figure 5:
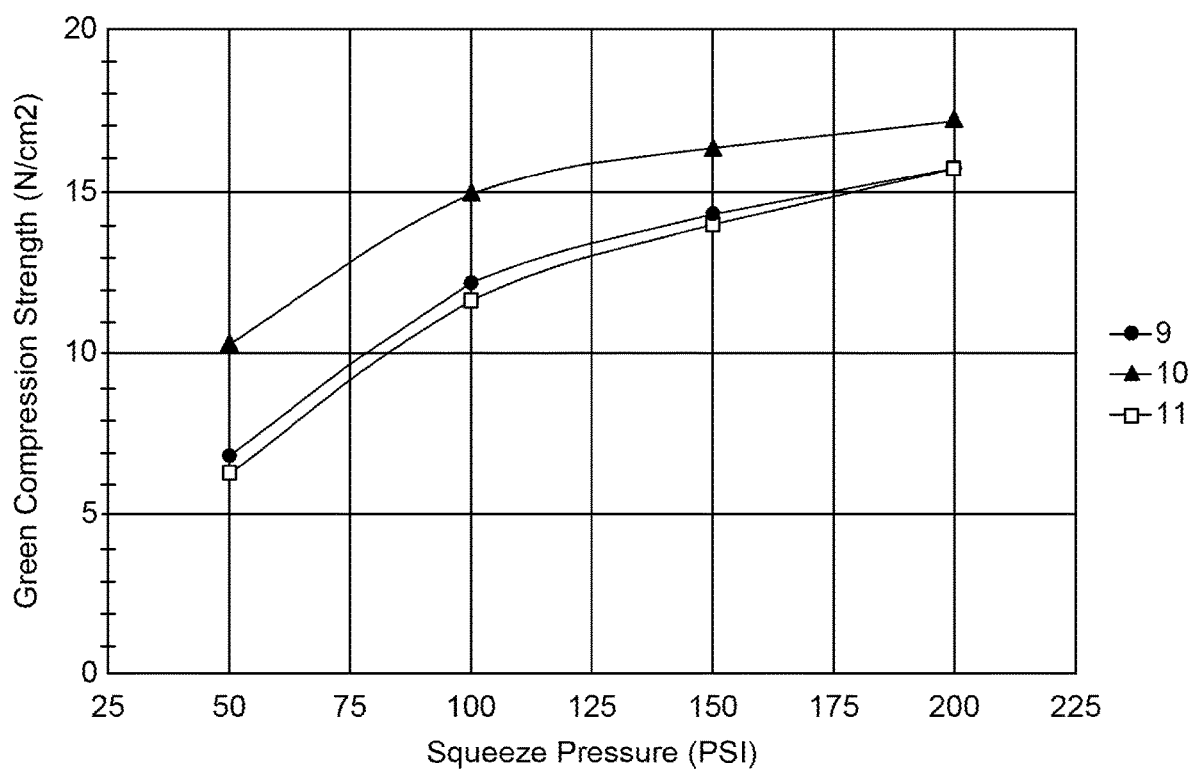
FIG. 5 is a graph of squeeze pressure (PSI) vs. green compression strength (N/cm$^2$) for various compositions, as discussed in Example 3.

FIG. 5 shows that adding mica to the clay/sand composition again resulted in higher green compression strength for a similar amount of squeeze pressure as compared to graphite or the clay/sand mixture without either mica or graphite.

Example 4

Green sand compositions 12-15 were prepared according to the procedure of Example 2 using a European bentonite clay in Compositions 12 and 13, and a Wyoming bentonite clay in Compositions 14 and 15. Green sand properties were measured according to AFS standards and testing procedures (AFS Mold and Core Test Handbook). Compositions 12 and 14 were prepared with 2% phlogopite mica, and Compositions 13 and 15 were prepared with 2% graphite. Results appear in Table 6. Hot compression strength measurements were performed on a test specimen of 50-52 g measuring 1⅛ inch by 2 inch. All other tests used a 2 inch by 2 inch specimen. Unless otherwise stated, the specimen weight was 161-162 g. "M. B. Clay" refers to the AFS methylene blue test as a qualitative measurement of bentonite clay in the prepared molding composition.

TABLE 6

| Composition | 12 | 13 | 14 | 15 |
| --- | --- | --- | --- | --- |
| Mica (wt %) | 2 | — | 2 | — |
| Graphite (wt %) | — | 2 | — | 2 |
| Moisture (%) | 1.73 | 1.7 | 1.67 | 1.58 |
| Compactability (%) | 44 | 46 | 46 | 46 |
| Green compression strength (N/cm$^2$) | 20.5 | 18.7 | 19.5 | 13.8 |
| Permeability | 177 | 167 | 167 | 162 |
| Wet Tensile(N/cm2) | 0.559 | 0.502 | 0.388 | 0.386 |
| Dry compression strength (N/m$^2$) | 13.85 | 12.95 | 15.9 | 23.5 |
| Friability | 3.67 | 5.75 | 2.96 | 7.28 |
| Cone jolt toughness | 40 | 28 | 36 | 18 |
| Green Shear strength (N/cm$^2$) | 6.85 | 5.8 | 6.1 | 4 |
| Flowability (PSI) | | | | |
| 155 g sample | 60 | 62 | 70 | 60 |
| 160 g sample | 130 | 120 | 124 | 120 |
| 165 g sample | 260 | 260 | 260 | 254 |
| Hot compression strength (PSI) at 1093° C. | 68 | 84 | 138 | 140 |
| Hot compression strength (PSI) at 982° C. | 278 | 308 | 230 | 190 |
| Hot compression strength (PSI) at 816° C. | 163 | 140 | 185 | 228 |
| Hot compression strength (PSI) at 538° C. | 90 | 63 | 85 | 88 |
| M.B. Clay % | 6.4 | 6.2 | 6.2 | 6.2 |

These results again demonstrate that incorporating mica into the green sand provides better mold strength and integrity. For example, Composition 12 exhibited superior green compression strength, wet tensile strength, friability (where lower values are preferred), cone jolt toughness (where higher values are preferred), and green shear strength. Likewise, Composition 14 exhibited superior dry compression strength, friability, green shear strength, and flowability as compared to Composition 15.

Studies were done to test the integrity of the sand molds formed from Compositions 12-15 over multiple casting cycles. The term "cycle" refers to five successive castings produced in gray iron (poured at approximately 2600° F.) with a 4:1 sand to metal ratio. The metal was gray iron and the casting was a simple rectangle plate. It was determined that the addition of mica or graphite did not influence mold integrity over multiple castings. It was also determined that mica and graphite did not influence the thermal expansion characteristics of the prepared molding sand.

It is intended that the specification and examples be considered as exemplary only, with a true scope and spirit of the present disclosure being indicated by the following claims.

I claim:

1. A sand casting composition comprising, by weight relative to a total weight of the sand casting composition: from about 80% to about 90% aggregate;
  from about 5.0% to about 15.0% inorganic binding agent; and
  from about 0.1% to about 5.0% high aspect ratio silicate; wherein:
    the aggregate comprises silica sand, chromite sand, or zircon sand,
    the high aspect ratio silicate has an aspect ratio greater than 10,
    the sand casting composition exhibits a 170 g squeeze pressure less than 300 PSI, and
    a combined weight of the aggregate, the inorganic binding agent, and the high aspect ratio silicate is less than or equal to 100%, relative to the total weight of the sand casting composition.

2. The sand casting composition of claim 1, wherein the high aspect ratio silicate comprises mica.

3. The sand casting composition of claim 1 wherein the high aspect ratio silicate comprises muscovite, paragonite, lepidolite, phlogopite, biotite, or a combination thereof.

4. The composition of sand casting claim 1, wherein the high aspect ratio silicate comprises talc.

5. The sand casting composition of claim 1, wherein the high aspect ratio silicate has an aspect ratio ranging from 10 to 1000.

6. The sand casting composition of claim 1, wherein the high aspect ratio silicate has an aspect ratio ranging from 20 to 100.

7. The sand casting composition of claim 1, wherein the high aspect ratio silicate has a $d_{50}$ particle diameter ranging from about 50 μm to about 100 μm.

8. The sand casting composition of claim 1, wherein the sand casting composition comprises from about 0.5% by weight to about 3.0% by weight of the high aspect ratio silicate, relative to the total weight of the sand casting composition.

9. The sand casting composition of any claim 1, wherein the sand casting composition comprises from about 5.0% by weight to about 10.0% by weight of the inorganic binding agent, relative to the total weight of the sand casting composition.

10. The sand casting composition of claim 1, wherein the sand casting composition comprises from about 85% by weight to about 90% by weight of the aggregate, relative to the total weight of the sand casting composition.

11. The sand casting composition of claim 1, wherein the inorganic binding agent comprises bentonite.

12. The sand casting composition of claim 1, wherein the sand casting composition further comprises graphite.

13. The sand casting composition of claim 1, wherein the sand casting composition further comprises from about 0.1% by weight to about 7.0% by weight of an organic material, relative to the total weight of the sand casting composition.

14. The sand casting composition of claim 1, wherein the sand casting composition further comprises from 0.1% by weight to about 5.0% by weight of another mineral, relative to the total weight of the sand casting composition.

15. The sand casting composition of claim 1, wherein the sand casting composition comprises water providing for a moisture content ranging from about 1.0% to about 4.0% by weight, relative to the total weight of the sand casting composition.

16. The sand casting composition of claim 1, wherein the inorganic binding agent comprises a clay, and
  wherein the high aspect ratio silicate comprises mica, talc, or a combination thereof.

17. A method of sand casting, the method comprising:
  preparing a sand casting composition by combining an aggregate, an inorganic binding agent, and a high aspect ratio silicate with water; and
  preparing a mold by forming the sand casting composition into a shape, wherein the sand casting composition includes, by weight relative to a total weight of the sand casting composition: from about 80% to about 90% aggregate;
    from about 5.0% to about 15.0% inorganic binding agent; and
    from about 0.1% to about 5.0% high aspect ratio silicate, and wherein:
      the aggregate comprises silica sand, chromite sand, or zircon sand,
      the high aspect ratio silicate has an aspect ratio greater than 10,
      the sand casting composition exhibits a 170 g squeeze pressure less than 300 PSI, and
      a combined weight of the aggregate, the inorganic binding agent, and the high aspect ratio silicate is less than or equal to 100%, relative to the total weight of the sand casting composition.

18. The method of claim 17, further comprising:
  introducing a metal or metal alloy into the mold to form a casted article; and
  removing the casted article from the mold.

19. The sand casting composition of claim 1, wherein the sand casting composition exhibits a green compression strength from about 5.0 N/cm² to about 20.0 N/cm².

20. The sand casting composition of claim 1, wherein the sand casting composition exhibits a squeeze pressure between 100 PSI and 150 PSI and a green compression strength between 10.0 N/cm² to about 18.0 N/cm².

* * * * *